R. B. BRYAN.
SELF BALING MACHINE.
APPLICATION FILED JAN. 17, 1912.
1,043,041.
Patented Oct. 29, 1912.
5 SHEETS—SHEET 1.
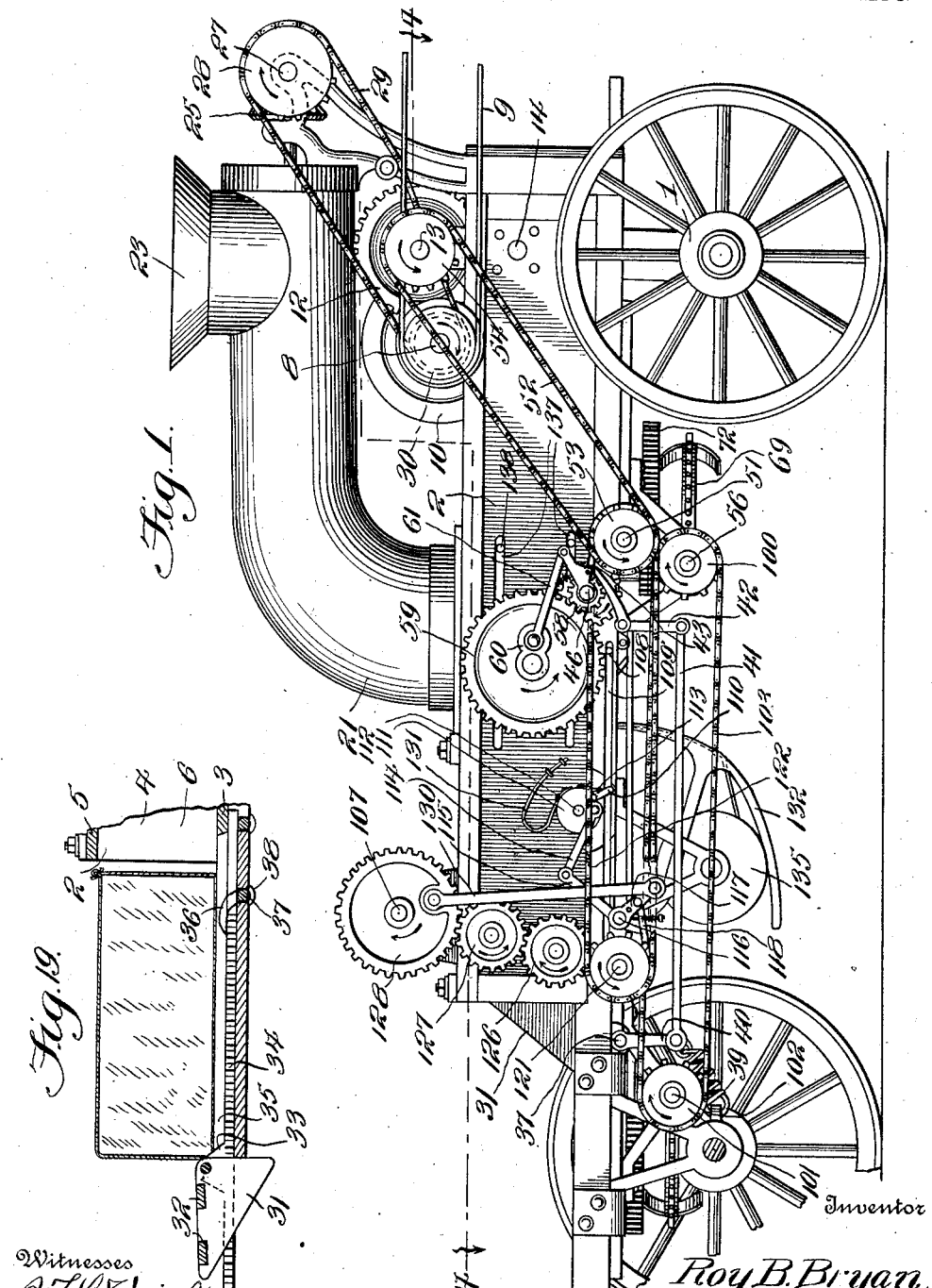

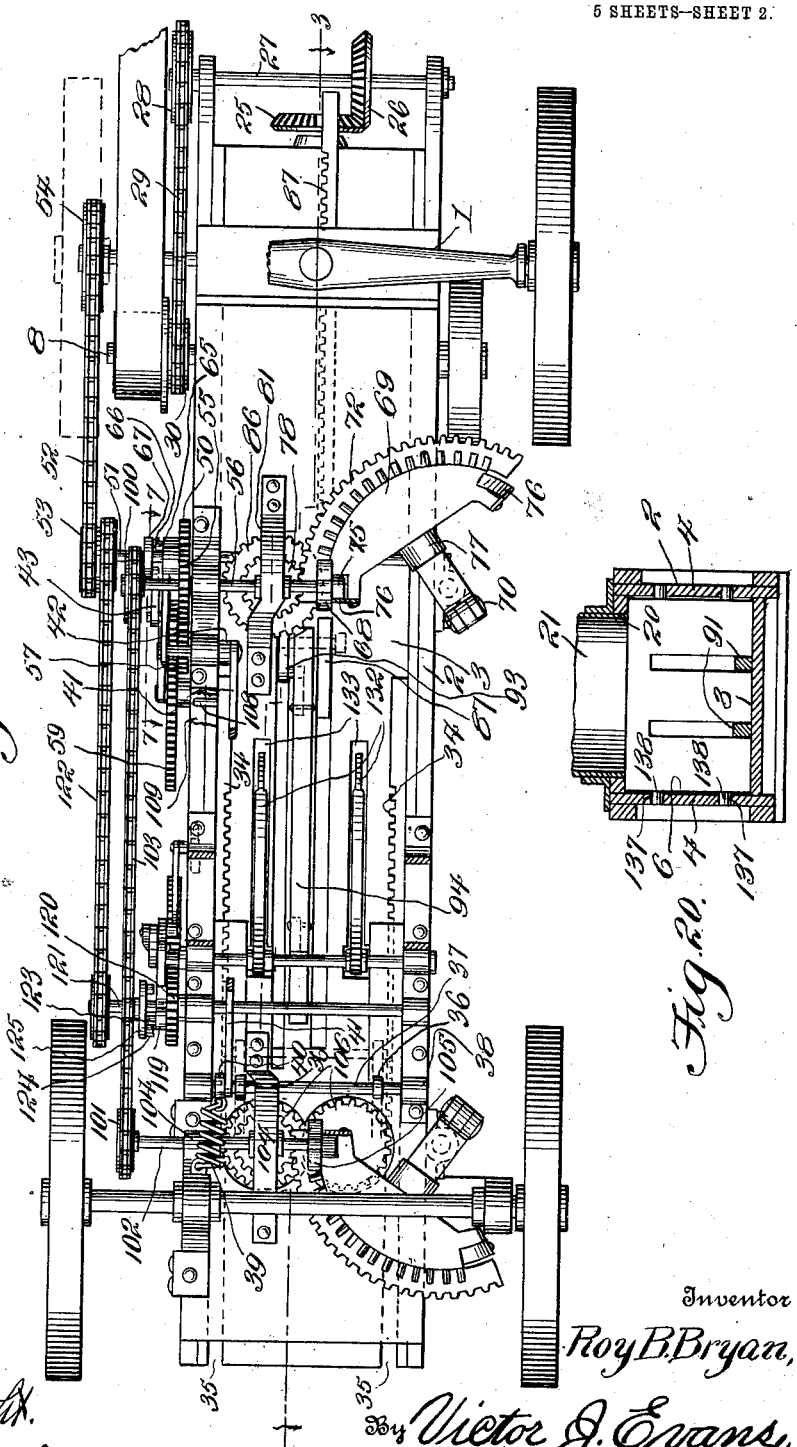

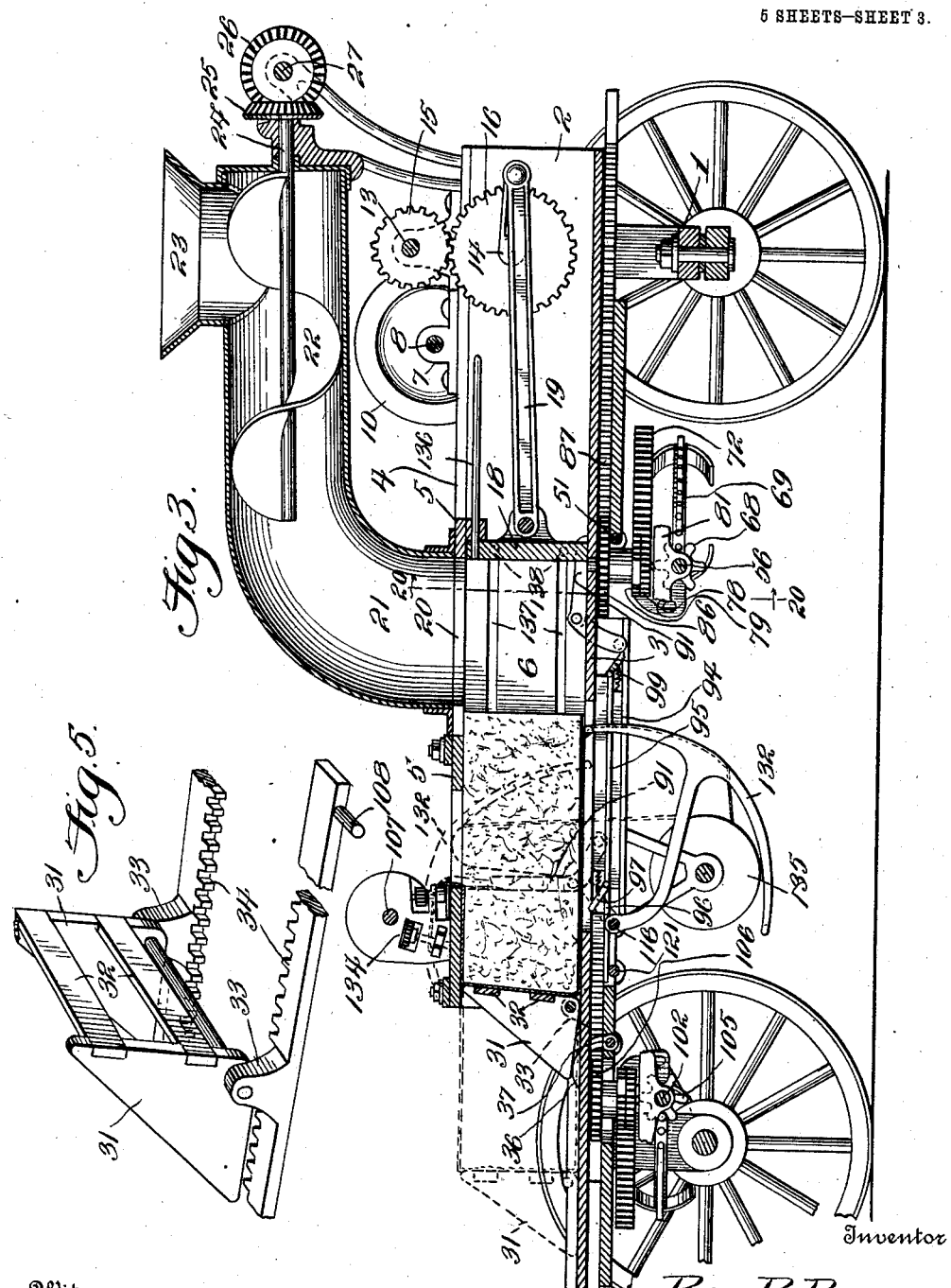

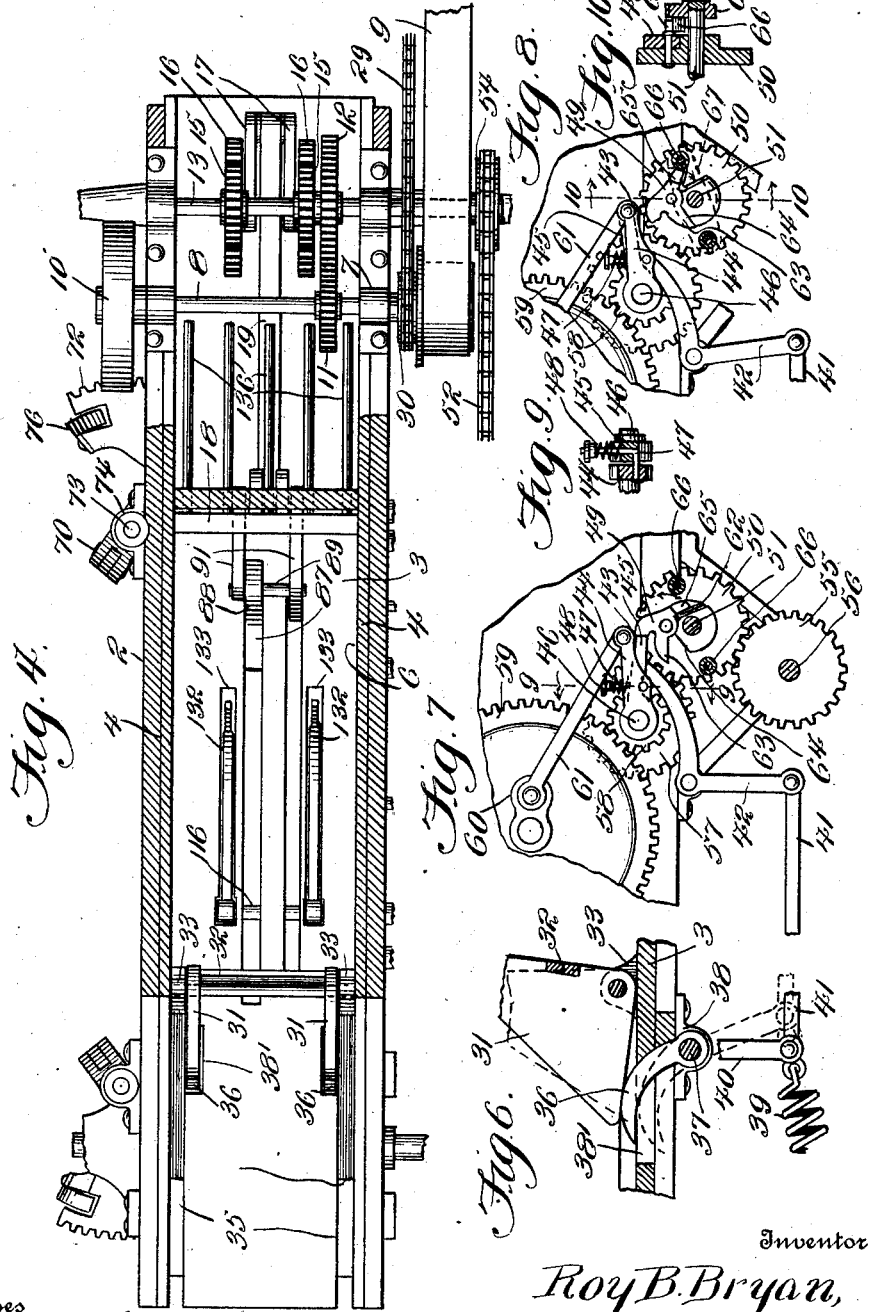

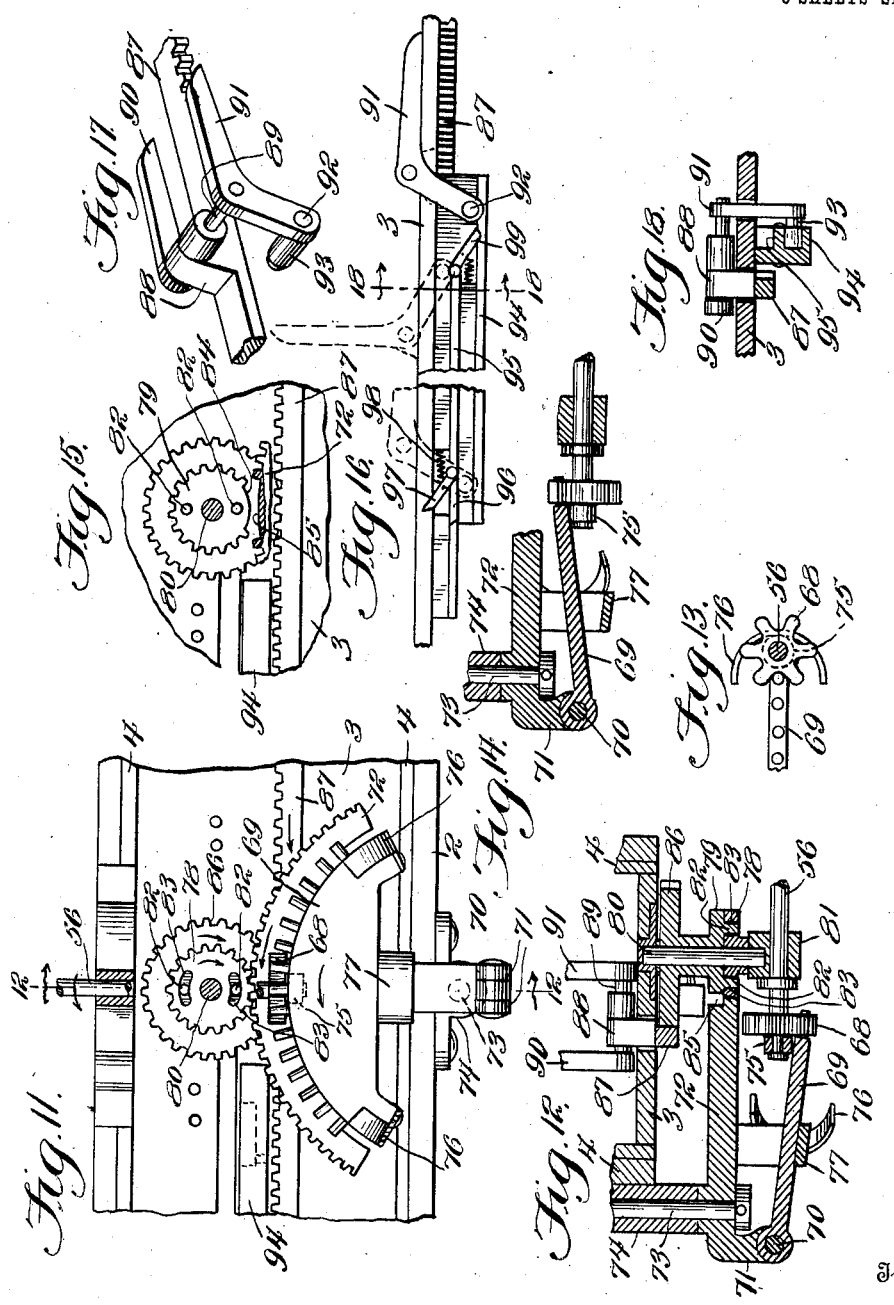

UNITED STATES PATENT OFFICE.

ROY B. BRYAN, OF LA FAYETTE, INDIANA.

SELF-BALING MACHINE.

1,043,041.  Specification of Letters Patent.  Patented Oct. 29, 1912.

Application filed January 17, 1912. Serial No. 671,602.

*To all whom it may concern:*

Be it known that I, ROY B. BRYAN, a citizen of the United States, residing at La Fayette, in the county of Tippecanoe and State of Indiana, have invented new and useful Improvements in Self-Baling Machines, of which the following is a specification.

This invention relates to baling machines and more particularly to that type in which suitable needle and knotter mechanisms are employed to tie the bale after it has been properly formed.

The object of the invention is to provide a simple and efficient machine of this character which will be purely automatic in its action, whereby only one attendant is required to operate the machine, this operator merely feeding the material to be baled to said machine.

A further object of the invention is the provision of means for holding the bale in the baling chamber until the predetermined size has been obtained and then automatically feeding the bale into tying position, holding the same in said position for a predetermined length of time, and finally automatically feeding the bale to discharge position and returning the parts to normal, whereby the machine is placed in condition for a second operation.

The invention embodies a continuously operating plunger and bale feeding mechanism which is controlled automatically by the pressure upon the bale and a binding mechanism controlled by the bale feeding means.

Further objects of this invention will appear as the following specific description is read in connection with the accompanying drawings, which form a part of this application, and in which:—

Figure 1 is a side elevation. Fig. 2 is a bottom plan view. Fig. 3 is a longitudinal section on the line 3—3 of Fig. 2. Fig. 4 is a horizontal section taken on the line 4—4 of Fig. 1. Fig. 5 is a detail perspective view of the bale abutment and its associated racks. Fig. 6 is a detail sectional view showing the arrangement of the bale abutment with the tripping levers. Fig. 7 is a detail sectional view showing an elevation of the tripping mechanism taken on the line 7—7 of Fig. 2. Fig. 8 is a similar section showing the parts in operated position. Fig. 9 is a sectional view on the line 9—9 of Fig. 7. Fig. 10 is a similar view on the line 10—10 of Fig. 8. Fig. 11 is a detail horizontal sectional view showing one of the double segments. Fig. 12 is a sectional view on the line 12—2 of Fig. 11.—Fig. 13 is a detail sectional view showing the position of the star wheel at the end of the lower segment. Fig. 14 is a view similar to Fig. 12 showing the lower segment raised upon the star wheel roller. Fig. 15 is a view similar to Fig. 12 with the segment and the slotted wheel omitted. Fig. 16 is a detail elevation of the tracks for the bale feeding arms. Fig. 17 is a detail perspective view of the bale feeding arms. Fig. 18 is a sectional view on the line 18—18 of Fig. 16. Fig. 19 is a detail longitudinal section showing the bale in discharging position. Fig. 20 is a transverse vertical section on the line 20—20 of Fig. 3.

Referring more particularly to the drawings, 1 represents a suitable running gear upon which is mounted an elongated box 2, whose bottom 3, sides 4, and top 5 form a baling chamber 6. Journaled in bearing brackets 7 carried by the sides 4 is a driving shaft 8 which is connected by a belt 9 to any suitable type of power. This shaft has the usual fly wheel 10 and intermediate the sides 4, the same has secured thereto a gear wheel 11 which meshes with a similar but larger gear 12 upon the shaft 13, also journaled in brackets and mounted upon the sides. This shaft 13 is connected to a crank shaft 14 through the gears 15 which mesh with gears 16 carried upon the crank shaft 14. Intermediate the gears 16 the shaft 14 is provided with a double crank 17 which is connected to the plunger 18 by a pitman 19. This plunger, therefore, slides back and forth in the baling chamber 6 and operates across the feed opening 20 which communicates with a feeding chute or pipe 21 having a screw conveyer 22 operating therein so as to drive the material from the hopper 23 through the feed opening 20 into position to be engaged by the plunger. The conveyer shaft is shown at 24 and is provided upon its end with a beveled gear 25 meshing with a similar gear 26 upon a shaft 27 which also carries a sprocket wheel 28. This sprocket wheel is connected to the driving shaft through a sprocket chain 29 which passes over the gear 28 and over a smaller gear of a similar nature indicated at 30 on the driving shaft 8. Thus, it will be noticed, that, while the driving shaft is in motion, the screw conveyer will be continuously rotated and the plunger continuously reciprocated. This action feeds the material to be conveyed to the baling chamber and when the bale is formed, as will be presently described, the same is discharged by the mechanism before referred to.

The material being acted upon by the plunger is compressed against an abutment which consists of side plates 31 connected together by cross bars 32. This abutment is pivoted upon lugs 33 on racks 34 slidably mounted in suitable guiding ways carried by the bottom 3 of the baling chamber, the lugs 33 projecting through slots 35 formed in said bottom. The side plates 31 bear directly upon curved tripping arms 36 which are keyed to a transverse shaft 37 journaled in brackets 38 upon the bottom 3 and held in elevated position through slots 38' in the bottom by means of tension springs 39 which are connected to the running gear and to arms 40 depending from the shaft 37. When the pressure upon the bale rises to a predetermined degree, the tension of the springs will be overcome and the tripping arms 36 will be depressed and the arm 40 moved forward. The arm 40 is connected through a link 41 to a bell crank lever 42 pivoted upon the side of the baling chamber and having its free end arranged beneath a locking pawl 43 which controls the bale feeding mechanism. This pawl, as indicated in Figs. 7 to 10, is constructed of two arms 44 and 45 loosely mounted upon a shaft 46 and connected together by an L-shaped rod 47 which is secured to the arm 44 and slides through a vertical opening in the arm 45, being provided with a tension spring and an adjusting nut 48 upon its upper end. This spring holds the arms in alinement under normal circumstances but permits their separation, as will be hereinafter described. The arm 45 lies in the path of a dog 49 which is pivoted upon a gear 50 loosely mounted upon a transverse shaft 51 which is continuously driven through a sprocket chain 52 connected to the shaft 51 by gears 53 and 54, the former keyed to the shaft 51 and the latter secured to the outer end of the shaft 13, which it would be noted, continuously rotates during the operation of the machine. The gear 50 is, however, held against rotation until the bale assumes a predetermined size by reason of the fact that the arm 45 is held in engagement with the dog 49. The gear 50 meshes with a similar gear 55 keyed to a counter shaft 56 and also with a gear 57 loosely mounted upon the shaft 46 and having keyed thereto a pinion 58 which meshes with a relatively large gear 59. This latter gear carries a crank arm 60 which is connected to the arm 44 by a link 61 so that when the shaft 51 starts to rotate, as will be hereinafter described, the links 61 will positively raise the arms 44 and 45 out of the path of the dog 49 until the wheel 59 has made a complete revolution, at which time the pawl 43 will be placed in position to engage the dog and stop the rotation of the gear 50.

The dog 49 is held in the position shown in Fig. 7 against the tension of a spring 62 by the arm 45 until released by said arm, at which time the spring 62 will throw the dog so that its arm 63 will rest against the limiting shoulder 64 in the position shown in Fig. 8. This will free the gear 51 and bring the lug 65 carried by the dog into the path of the laterally projecting ends 66 of an arm 67 which is keyed to the shaft 51 and continuously rotates therewith. When the arm contacts with the lug of the dog, the gear 50 will be rotated which will in turn operate the gears 55 and 57, the latter actuating the gear 59 through the pinion 58 to positively withdraw the pawl 43 from the path of the dog 49 until, as before stated, the gear 59 has made a complete revolution. The gearing is so constructed that the gear 50 will rotate six times during a single rotation of the gear 59 and these six revolutions of the gear 50 will be sufficient to drive the bale out of the chamber and return the parts to normal, as will be now described.

Keyed to the inner end of the shaft 56 is a star wheel 68 which meshes with a spur segment 69 hinged, as shown at 70, to the depending arm 71 of a rack segment 72 which is pivoted for oscillatory movement on a stub shaft 73 carried by a bracket 74 secured to the side 4 of the baling chamber. The inner end of the shaft is also provided with a friction roller 75 which bears upon the opposite faces of the spur segment 69 beyond the spurs thereof and is adapted in one position to support said segment, as shown in Fig. 14. The opposite ends of the segment 69 are provided with arcuate guides and limiting members 76 which are engaged by the roller, as shown in Fig. 13, so that when the star wheel engages the last spur of the segment, the same will be depressed to ride beneath the roller 75, the downward movement being limited by a bracket 77 carried by the segment 72. In the initial movement of the segments 69 and 72, the segment 69 rests upon the wheel 75 until the star wheel engages the last spur, at which time the continued rotation of the star wheel will drive the segments in their reverse direction so as to return the parts to normal.

The segment 72 is provided with a relatively wide toothed face so as to engage a pair of juxtaposed gears 78 and 79, both of which are journaled upon a stub shaft 80 depending from the bottom of the baling chamber and supported in the bracket 81, which also forms a journal for the inner end of the shaft 56. The gear wheel 79 is provided with a pair of studs 82 which enter suitable arcuate slots 83 formed in the gear 78. The gear 79 is provided with a mutilated section 84 which is adapted to coincide with the mutilated section 85 on the upper portion of the gear segment 72 so that at predetermined times, when the gear 79 has its mutilated portion 84 coincident with the mutilated portion 85 of the gear segment 72, the gear 79 will not be rotated until the pins 82 contact with the end wall of the slots 83, at which time, both gears 78 and 79 will be in mesh with the segment 72 and both simultaneously rotated. The gear 79 is connected through a collar to a somewhat larger gear 86 which meshes with a rack bar 87 slidably mounted upon the bottom of a baling chamber and carrying a lug 88 in which is journaled a shaft 89. Upon opposite ends of this shaft are feeding arms 90 and 91, the latter being provided with a substantially right angular offset in which there is a laterally projecting stud 92 having an antifriction roller mounted thereon and adapted to travel in tracks 94 and 95 secured upon the bottom of the baling chamber, one above the other. The track 95 is provided with an aperture 96 and with a switch 97 which is adapted to close said aperture and which is normally held in raised position by a spring 98. A similar switch, 99, spring actuated, is pivoted to the end of the track 95 and is adapted to rest upon the track 94. Thus, it will be seen that when the rack bar is moved forward by the action of the segment 72 and its associated parts, that the roller will ride over the switch 99 on to the track 95, thereby raising the bale expelling arms 90 and 91 into position to engage the bale. The roller moves along the track 95, and depresses the switch 97 until it gets to full end of its movement, at which time the rack bar will be returned by the automatic action of the star wheel and spur segment and the roller will pass beneath the switch 97 on to the track 94 where it will trip past the switch 99. These arms are thrown to depressed position so as to pass beneath any material which has been forced into the baling chamber by the conveyer, their free ends being sheared off, as shown, so as to readily enter beneath the material.

Simultaneously with the movement of the rack bar 87, the rack bars 34 will be moved in the same direction by means of the following mechanism: Keyed to the shaft 56 is a sprocket wheel 100 which is connected to a similar sprocket wheel 101 on a shaft 102 by means of a sprocket chain 103. The shaft 102 is journaled in bearings 104 and carries upon its inner end a star wheel 105. This star wheel actuates a double segment similar to those indicated at 69 and 72 and which operates in a similar manner as that described for those segments, and gears 106, these gears meshing with the rack bars 34, their operation being interrupted in a similar manner so as to give the knotter mechanism sufficient time to operate. In order that the knotter shaft indicated at 107 may be operated at a time when the racks are idle by reason of the mutilated portions of the gears being in register, one of the rack bars 34 is provided with a laterally extending pin 108 which projects through the slot 109 in the side of the baling chamber and in position to engage a tripping lever 110 pivoted upon a disk 111 rotatably mounted upon a stub shaft 112. The tripping lever lies across the slot in the path of the pin 108 and is normally held against a shoulder on the disk 111 by a spring 113 which permits the displacement of the tripping lever by the pin in its retrograde movement without operating the disk. This disk has connected to it a link 114 which is, in turn, pivoted to a crank arm 115 loosely mounted upon a shaft 116 which is journaled upon the bottom of the baling chamber. The shaft 116 has a lever 117 keyed thereon upon which is pivoted a pawl 118 similar to the pawl 43. This pawl is operated by the lever 115 so as to be thrown out of the path of a dog 119 which is carried upon a gear 120 loosely mounted upon a shaft 121. This shaft is driven by a sprocket chain 122 which connects the shaft 121 with the shaft 51. When the pawl 118 is thrown out of the way, the dog 119 will be operated in a similar manner to the dog 49 by the spring 62 so as to throw its lug 123 into the path of the projections 124 on the arm 125 which is keyed to the shaft. This causes the gear 120 to rotate with the shaft and through the gears 126, 127 and 128 to rotate the knotter shaft.

The rotation of the gear 128 causes the crank arm 117 to be raised through a link 130. The relative relation between the gears 128 and 120 is one to two so that during one oscillation of the knotter shaft, the pawl will be held out of engagement with the gear 120 during two revolutions of said gear. When these parts are brought to their normal position, as shown in Fig. 1, the disk 111 will be returned to its normal position by means of a bowed spring 131.

Keyed to the shaft 116 are separate needle members 132 which operate through slots 133 formed in the bottom of the baling chamber and extend to the position shown in dotted lines in Fig. 3 through the knotter mechanism, generally indicated at 134 and which is fully described in my copending application, Serial Number 587,717, and filed October 18, 1910, or through any other suitable type of knotter mechanism. The cord or wire being used is obtained from the spool 135.

As the plunger passes across the opening 20, it is necessary to provide some means for preventing the material in the chute or delivery pipe 21 being forced back of the plunger. To accomplish this purpose, there is attached to the upper end of the plunger a plurality of fingers 136 which close the opening until the plunger has receded. It is also necessary to provide some means for holding the plunger in upright position and to accomplish this, the sides of the baling chamber are slotted, as shown at 137, so as to receive pins 138 projecting from the sides of the plunger.

In the operation of the device, the material is placed in the hopper 23, picked up by the conveyer 22, and forced into the baling chamber 6, where it is acted upon by the plunger in the usual manner. When the pressure of the bale upon the abutment rises to a predetermined degree, the sides of the abutment 31 will force the tripping levers 36 downwardly to the position shown in dotted lines in Fig. 6 against the tension of the spring 39. This action will cause the rod or link 41 to operate upon the bell crank lever and raise the pawl 43 out of engagement with the dog 49. The spring 62 then has to throw the dog to the position shown in Fig. 8 so as to bring the lug 65 thereon into the path of the projections 66 of the arm 67 and which rotates with the shaft 51. The gear 50 is therefore caused to rotate with said shaft 51 and meshing with the gear 57 drives the gear 59 through the pinion 58, so that the inner pawl is raised out of the path of the dog 49 until the gear 59 has made one complete revolution to six revolutions of the gear 51, this gear 51 being in mesh with a gear 55 and being connected to the gear 120 through the sprocket chain 122 will drive the shaft 102 and also the shaft 121. As the shafts 56 and 102 rotate the star wheels thereon engage the segments upon the under side and carry them forwardly, these segments being operatively connected with the rack bars 34 and 87 will drive these rack bars forwardly for a predetermined distance until the mutilated portion of the segment and gears before mentioned, come into register, at which time the motion of the rack bars will be stopped. Upon the initial movement of the rack bar 87, the arms 90 and 91 will be thrown up against the bale so as to hold it in form and force it out of the chamber until the needle can come into operation to tie the binding cord or wire around the bale at a time immediately before the rack bars come to a stop, the pin 108 comes into engagement with the tripping lever 110 so that the pawl 118 will be tripped and the gear 120 thrown into operation. When this gear is thrown into operation, the knotter mechanism is operated and the bale tied. Immediately after the completion of this operation, the pins 82 will engage the end walls of the slots 83 with the gear 78 and this being in constant mesh with the segment, will be rotated to bring the gears 79 again into mesh with the segments, at which time the rack bars will be again moved so as to carry the bale to discharging position, as shown in Fig. 19. At this time, the rollers 75 upon the star wheels come into contact with the guards 76 upon the end of the segments and the segments are thereby forced under the star wheel and carried in the opposite direction by the rotation thereof. The stop caused by the mutilation of the gears and segments will occur in the retrograde movement just the same as in the forward but there is no function performed thereby except that the gears are reset to repeat the cycle of movement described.

What is claimed is:—

1. In a baling press, a baling chamber, a plunger mounted therein, means for continuously reciprocating said plunger, and means controlled by the pressure of the plunger upon the bale being formed to automatically discharge the bale from the baling chamber.

2. In a baling press, a baling chamber, a plunger mounted therein, means for continuously reciprocating said plunger, automatic means controlled by the pressure of the plunger upon the bale being formed for holding the bale in formed position and for moving the same out of the baling chamber, and means for automatically returning said bale moving means to normal position.

3. In a baling press, a baling chamber, a plunger mounted therein, means to continuously reciprocate the plunger, a pivoted bale abutment actuated by the pressure on the bale, and means controlled by said abutment for automatically moving the bale out of the baling chamber.

4. In a baling press, a baling chamber, a plunger mounted therein, means to continuously reciprocate the plunger, means for moving the bale to discharging position out of the baling chamber, means for normally holding said moving means in inoperative position, means for automatically throwing said moving means into operative position.

5. In a baling press, a baling chamber, a plunger mounted therein, means for continuously reciprocating the plunger and bale abutment, means for moving said abutment to bale discharging position, a bale moving mechanism, means for normally holding the abutment and bale moving mechanisms in idle position, and means for rendering said holding means inoperative.

6. In a baling press, a baling chamber, a plunger mounted therein, means for continuously reciprocating the plunger, a pivoted bale abutment movable longitudinally in the baling chamber, means actuated by the abutment when the pressure thereon by the bale rises to a predetermined degree for moving said abutment to bale discharging position, means controlled by said last-named means by moving the bale to discharging position, and means for returning the bale abutment and bale moving mechanisms to normal.

7. In a baling press, a baling chamber, a plunger operatively mounted therein, a bale abutment, automatic mechanism controlled by the pressure of the bale on the abutment for moving the bale to discharge position, and means for interrupting the travel of the bale for a predetermined time.

8. In a baling press, a baling chamber, a plunger reciprocately mounted therein, a bale abutment, means controlled by the bale abutment for automatically moving said abutment to bale discharging position, means controlled by the abutment for moving the bale to the bale discharging position, and mechanisms for interrupting the travel of the abutment and the bale moving mechanism for a predetermined time.

9. In a baling press, a baling chamber, a plunger reciprocately mounted therein, a bale abutment and bale moving mechanism, and means controlled by the bale abutment for reciprocating said bale moving mechanism and interrupting the movement thereof in one leg of its travel.

10. In a baling press, a baling chamber, a plunger reciprocately mounted therein, a bale abutment and bale moving mechanism, and means controlled by the bale abutment for reciprocating said bale moving mechanism and interrupting the movement thereof in one leg of its travel, including a mutilated gear segment and gear.

11. In a baling press, a baling chamber, a plunger reciprocately mounted therein, longitudinally movable supports mounted in the baling chamber, a bale abutment pivoted on said support, spring actuated means for preventing the depression of the abutment, and means controlled by said spring actuated means when the abutment is depressed against the tension of the spring for reciprocating said supports.

12. In a baling press, a baling chamber, a plunger reciprocately mounted therein, longitudinally movable supports mounted in the baling chamber, a bale abutment pivoted on said supports, spring actuated means for preventing the depression of the abutment, means controlled by said spring actuated means when the abutment is depressed against the tension of the spring for reciprocating said supports, and means automatically thrown into operation by the spring actuated means for moving the formed bale and the abutment.

In testimony whereof I affix my signature in presence of two witnesses.

ROY B. BRYAN.

Witnesses:
EDGAR G. COLLINS,
JAY C. GORIS.

---

Copies of this patent may be obtained for five cents each, by addressing the "Commissioner of Patents, Washington, D. C."